(12) United States Patent
    Li

(10) Patent No.: US 10,270,066 B2
(45) Date of Patent: Apr. 23, 2019

(54) PEDESTAL OF LASER PACKAGING DEVICE AND LASER PACKAGING DEVICE

(71) Applicant: BOE TECHNOLOGY GROUP CO., LTD., Beijing (CN)

(72) Inventor: Yi Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 617 days.

(21) Appl. No.: 15/081,054

(22) Filed: Mar. 25, 2016

(65) Prior Publication Data

US 2017/0092515 A1    Mar. 30, 2017

(30) Foreign Application Priority Data

Sep. 24, 2015   (CN) .......................... 2015 1 0618612

(51) Int. Cl.
| | | |
|---|---|---|
| B32B 3/00 | (2006.01) | |
| H01L 51/56 | (2006.01) | |
| B23K 26/00 | (2014.01) | |
| H01L 51/52 | (2006.01) | |

(52) U.S. Cl.
CPC .............. *H01L 51/56* (2013.01); *B23K 26/00* (2013.01); *H01L 51/524* (2013.01)

(58) Field of Classification Search
CPC .............................. H01L 51/56; H01L 51/524
See application file for complete search history.

(56) References Cited

U.S. PATENT DOCUMENTS

| 2004/0148765 A1 | 8/2004 | Casey et al. | |
|---|---|---|---|
| 2010/0116119 A1* | 5/2010 | Bayne | C03B 33/033 83/880 |
| 2012/0318771 A1* | 12/2012 | Guo | G02F 1/1303 216/20 |

FOREIGN PATENT DOCUMENTS

| CN | 200998432 Y | 1/2008 |
|---|---|---|
| CN | 201851969 U | 6/2011 |
| CN | 102701591 A | 10/2012 |
| CN | 103022374 A | 4/2013 |
| CN | 103214185 A | 7/2013 |
| CN | 103681771 A | 3/2014 |
| CN | 104116371 A | 10/2014 |
| JP | H03-218977 A | 9/1991 |

OTHER PUBLICATIONS

First Office Action regarding Chinese application No. 201510618612. 1, dated Aug. 29, 2016. Translation provided by Dragon Intellectual Property Law Firm.

* cited by examiner

*Primary Examiner* — Elizabeth E Mulvaney
(74) *Attorney, Agent, or Firm* — Harness, Dickey & Pierce, P.L.C.

(57) ABSTRACT

A laser packaging device and its pedestal are provided. The pedestal includes a metal pedestal body and thermal-insulation structures. The thermal-insulation structures are provided at a side of the metal pedestal body supporting a substrate to be packaged. The thermal-insulation structures correspond to glass-powder areas of sub-substrates within the substrate to be packaged in a one-to-one manner.

16 Claims, 2 Drawing Sheets

PEDESTAL OF LASER PACKAGING DEVICE AND LASER PACKAGING DEVICE

CROSS-REFERENCE TO RELATED APPLICATION

This application claims a priority to Chinese Patent Application No. 201510618612.1 filed on Sep. 24, 2015, the disclosures of which are incorporated in their entirety by reference herein.

TECHNICAL FIELD

The present disclosure relates to the field of display device manufacturing, and in particular to a pedestal of a laser packaging device and a laser packaging device.

BACKGROUND

In recent years, Organic Light-Emitting Diode (OLED) has been widely applied in the fields of panel display and illumination. A service life of an OLED chip is prone to be adversely influenced by oxygen and water vapor. When oxygen and water vapor is infiltrated, a cathode of the OLED will be oxidated, and a demoulding and a crystallization of an organic layer may occur, and then the OLED may be aged too early or even broken. A common adverse influence includes dark spots, a pixelshrinkage and an attenuation of light intensity. According to process requirements of the OLED, packaging of the OLED enhances a mechanical strength of the OLED. In addition, the OLED may be insulated from the oxygen and water vapor. According to the industry standard, a service life of a commercial OLED product is required to be at least 10000 hours, and a storage life thereof is required to be at least 50000 hours, so it is required that a water vapor transmission rate (WVTR) is required to be smaller than $10^{-6}$ g/m$^2$/day, and an oxygen transmission rate (OTR) is required to be smaller than $10^{-5}$ cc/bar/m$^2$/day, and the requirement of the WVTR and OTR is more strict than that of a Liquid Crystal Display (LCD). Therefore, it has became a main objective for the development of the packaging process and devices to efficiently join the processes with respect to the cover plate and the substrate and reduce a cost of the packaging process to achieve a best mass production rate.

The OLED packaging technologies in the related art generally includes (1) UV glue edge sealing, (2) laser glass-powder packaging, and (3) thin film packaging. The first packaging method is simple, but a leakproofness thereof is poor, and a desiccant is needed, and then a service life of an OLED packaged by the first packaging method is relatively short. A cost of the third method is low, and a product packaged by this method is thin and light, and the WVTR and OTR are small, and the method is mainly appropriate for a big-size flexible substrate. However, the third method is not mature, of which a pressuretightness has not meet the requirement of the long-service-life device such as OLED television. The second method is preferred for the OLED packaging at present because of a good packaging pressure-tightness, good low-temperature selectivity and a mature process of the laser-assisted glass-powder packaging process.

In the related art, the laser glass-powder packaging applies a scanning packaging method, by which an OLED substrate to be packaged is arranged on a pedestal of a laser packaging device, and scanning and heating are performed along a path of pre-sintered glass powders on the OLED substrate in sequence to complete the packaging.

However, the OLED substrate contacts the pedestal directly, and the pedestal is made of metal, such that heat transferred by the laser will be transferred to the pedestal quickly when the glass powders are scanned by the laser, and then the glass powders will be cooled quickly. When the glass powders are cooled quickly after being irradiated by the laser, the probability of occurring cracks in the glass substrate and the glass powders may be increased due to a rapid temperature change. In addition, even if the cracks are not occurred, defective products may occur due to that the durability of the glass substrate is lowered.

SUMMARY

A laser packaging device and its pedestal are provided by some embodiments of the present disclosure to slow a cooling speed of glass powders, thereby reducing a probability of occurrence of cracks after packaging the substrate and the glass powders and then improving a yield of the packaging.

To achieve the objective hereinabove, the present disclosure provides the following solutions.

A pedestal of a laser packaging device is provided by some embodiments of the present disclosure, including metal pedestal body and thermal-insulation structures. The thermal-insulation structures are provided at a side of the metal pedestal body supporting a substrate to be packaged, and the thermal-insulation structures correspond to glass-powder areas of sub-substrates within the substrate to be packaged in a one-to-one manner.

According to the pedestal of the laser packaging device provided by the present disclosure, the presence of the thermal-insulation structures on the metal pedestal body can reduce heat dissipation rate of the heat transferred to the glass powders by the laser, thereby avoiding a rapid temperature change of the glass powders and the glass substrate, reducing probability of the occurrence of cracks after packaging the substrate and the glass powders, and then improving a yield of the product.

Optionally, each of the thermal-insulation structures includes a plurality of bar-like grooves arranged in the metal pedestal body; openings of the bar-like grooves are arranged toward to the substrate to be packaged. The presence of the bar-like grooves can prevent a portion of the substrate corresponding to the glass powder areas from contacting with the metal pedestal body and then a heat dissipation rate of the glass powders may be lowered.

Optionally, the pedestal further includes an air vent defined in each of the bar-like grooves; wherein the air vent is in communication with a gasholder outside the pedestal and is to guide hot-gas in the gasholder to the substrate to be packaged. The presence of the air vent helps to keep temperature of the glass powders. By guiding the hot-gas to a side of the glass powders far away from the laser, a temperature reduction rate of the glass powders may be lowered.

Optionally, the thermal-insulation structures are in communication with each other; the pedestal further includes an air vent in communication with a gasholder outside the pedestal; the air vent is in communication with the thermal-insulation structures and is to guide hot-gas in the gasholder to the substrate to be packaged. By such arrangement, the number of pipe lines is reduced, thereby preventing a temperature of the metal pedestal body from being influenced by too many heat-conduction pipe lines.

Optionally, the air vent is surrounded by the plurality of thermal-insulation structures.

Optionally, each glass-powder area forms a rectangular ring; each of the thermal-insulation structures includes two pairs of the bar-like grooves; the bar-like grooves in each pair extend along the same direction, and the two pairs of the bar-like grooves are in communication with each other to form the rectangular-ring-like thermal-insulation structure.

Optionally, each of the thermal-insulation structures includes a plurality of bar-like thermal-insulation layers arranged at the metal pedestal body. The presence of the bar-like thermal-insulation layers can prevent heat transferring from the glass powders to the metal pedestal body.

Optionally, the pedestal further includes a plurality of grooves defined in the metal pedestal body; wherein the plurality of bar-like thermal-insulation layers is arranged in the grooves.

Optionally, the plurality of bar-like thermal-insulation layers is arranged in the grooves with upper surfaces of the plurality of bar-like thermal-insulation layers being flush with a supporting surface of the metal pedestal body for supporting the substrate to be packaged.

Optionally, the plurality of bar-like thermal-insulation layers is arranged in the grooves with upper surfaces of the plurality of bar-like thermal-insulation layers protruding from a supporting surface of the metal pedestal body for supporting the substrate to be packaged.

Optionally, each glass-powder area forms a rectangular ring; each of the thermal-insulation structures includes two pairs of the bar-like thermal-insulation layers; the bar-like thermal-insulation layers in each pair extend along the same direction, and the two pairs of the bar-like thermal-insulation layers are connected to each other to form the rectangular-ring-like thermal-insulation structure.

Optionally, the bar-like thermal-insulation layers include aluminium silicate fiber, silica fiber or asbestos.

Optionally, a center line of each edge of the rectangular-ring-like thermal-insulation structure in a widthwise direction is aligned with a center line of a corresponding edge of the rectangular-ring-like glass-powder area in a widthwise direction, and a difference between a width of each edge of the rectangular-ring-like thermal-insulation structure and a width of a corresponding edge of the corresponding rectangular-ring-like glass-powder area is smaller than 10 millimeters, so as to prevent the thermal-insulation structures from breaking down other parts of the device.

Optionally, each of the thermal-insulation structures inlcudes a plurality of bar-like grooves defined in the metal pedestal body and filler in the plurality of bar-like grooves; wherein the filler has a thermal conductivity smaller than a thermal conductivity of the metal pedestal body.

Optionally, the filler is air, aluminum silicate fiber, silica fiber or asbestos.

A laser packaging device is provided by some embodiments of the present disclosure, including the pedestal hereinabove. By the pedestal hereinabove, a cooling speed of the glass powders may be slowed, and then a probability of the occurrence of cracks after packaging the substrate and the glass powders may be reduced, thereby improving a yield of the packaging. Therefore, the laser packaging device provided by some embodiments of the present disclosure has a good usability.

DRAWING REFERENCE

1—metal pedestal body; 11—bar-like groove; 12—bar-like thermal-insulation layer; 2—substrate to be packaged; 3—glass powders; 4—air vent

DETAILED DESCRIPTION

Technical solutions of embodiments of the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Figure 1:
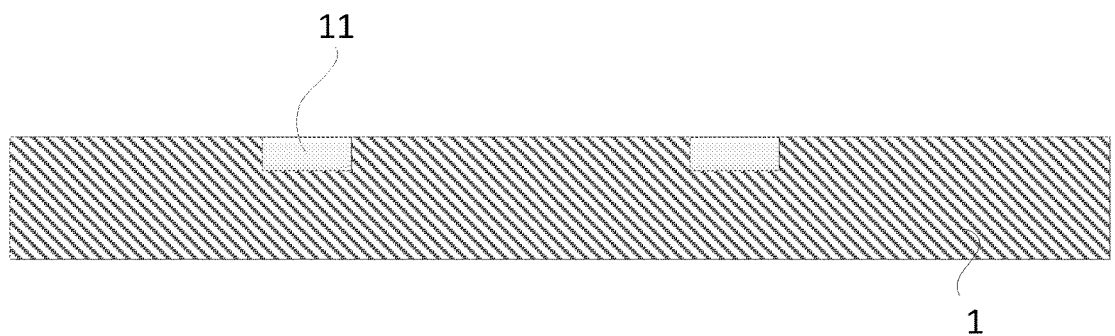
FIG. 1 is a sectional view of a pedestal of a laser packaging device provided by some embodiments of the present disclosure.
Figure 2:
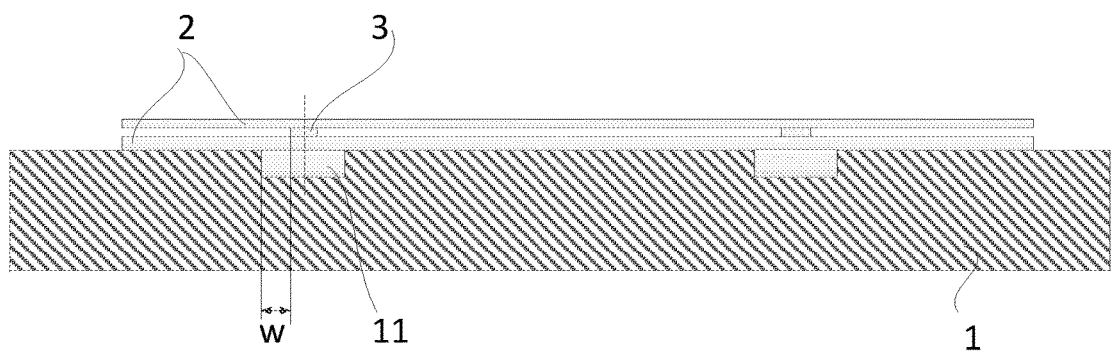
FIG. 2 is a sectional view of the pedestal of the laser packaging device together with a substrate to be packaged provided by some embodiments of the present disclosure.

As shown in FIG. 1 and FIG. 2, FIG. 1 is a sectional view of a pedestal of a laser packaging device provided by some embodiments of the present disclosure, and FIG. 2 is a sectional view of the pedestal of the laser packaging device together with a substrate 2 to be packaged provided by some embodiments of the present disclosure. In one embodiment of the present disclosure, the pedestal of the laser packaging device includes a metal pedestal body 1 and thermal-insulation structures. The thermal-insulation structures are provided on one side of the metal pedestal body 1 where the substrate 2 to be packaged is supported. The thermal-insulation structures correspond to glass-powder areas of sub-substrates within the substrate 2 to be packaged in a one-to-one manner.

According to the pedestal of the laser packaging device provided by the present disclosure, the presence of the thermal-insulation structures on the metal pedestal body 1 can reduce heat dissipation rate of the heat transferred to the glass powders 3 by the laser, thereby avoiding a rapid temperature change of the glass powders 3 and the substrate such as a glass substrate, reducing the probability of the occurrence of cracks after packaging the substrate 2 and the glass powders 3, and improving a yield of the product.

The structures of the thermal-insulation structures will be described as follows.

Figure 3:
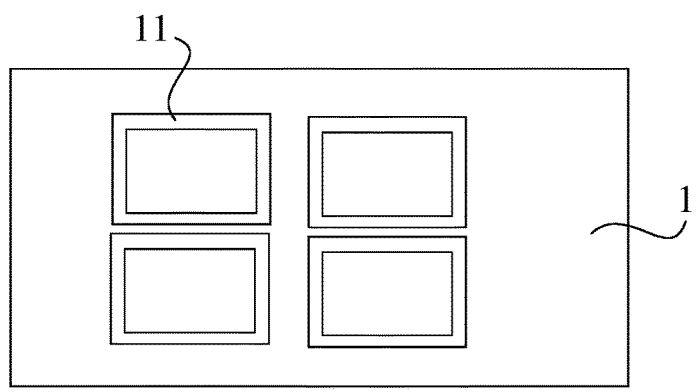
FIG. 3 is a schematic view showing distribution of bar-like grooves in the pedestal of the laser packaging device provided by some embodiments of the present disclosure.
Figure 4:
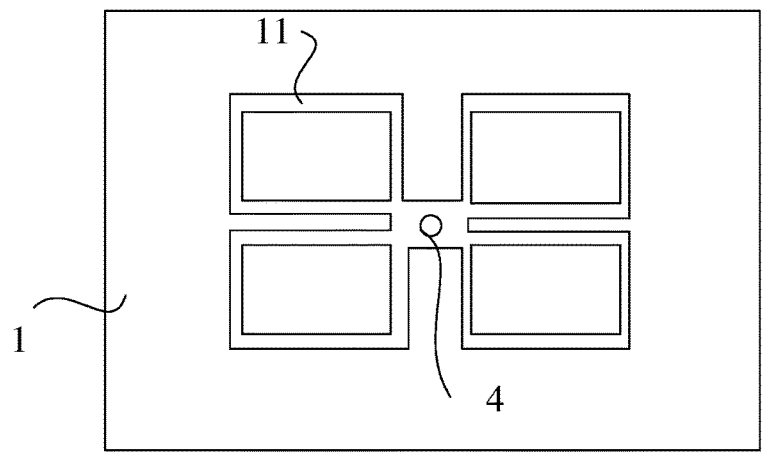
FIG. 4 is a schematic view showing another distribution of bar-like grooves in the pedestal of the laser packaging device provided by some embodiments of the present disclosure.

In some embodiments of the present disclosure, as shown in FIG. 3 which is a schematic view showing distribution of bar-like grooves 11 in the pedestal and FIG. 4 which is a schematic view of another distribution of bar-like grooves in the pedestal, each thermal-insulation structure includes a plurality of bar-like grooves 11 arranged in the metal pedestal body 1. Openings of the bar-like grooves 11 are arranged toward to the substrate 2 to be packaged. The presence of the bar-like grooves 11 can prevent a portion of the substrate corresponding to the glass powder areas from contacting with the metal pedestal body 1, and then a heat dissipation speed of the glass powders 3 may be lowered.

Furthermore, an air vent 4 is provided in each bar-like groove 11 and in communication with a gasholder outside the pedestal. Hot-gas in the gasholder is guided to the substrate 2 to be packaged via the air vent 4. The presence of the air vent 4 helps o keep temperature of the glass powders 3. By guiding the hot-gas to a side of the glass powders 3 far away from the laser, a temperature reduction rate of the glass powders 3 may be lowered.

The temperature of the gas in the gasholder may be adjustable.

As shown in FIG. 4, a plurality of thermal-insulation structures are in communication with each other, and an air vent 4 is provided in communication with the thermal-insulation structures and in communication with a gasholder outside the pedestal. Hot-gas in the gasholder is guided to the substrate 2 to be packaged via the air vent 4. By such arrangement, the number of pipe lines is reduced, thereby preventing the temperature of the metal pedestal body 1 from being influenced by too many heat-conduction pipe lines.

In the related art, the display device is generally rectangular, so each glass-powder area forms a rectangular ring. Accordingly, each thermal-insulation structure includes two pairs of bar-like grooves 11. The bar-like grooves 11 in each pair extend along the same direction. The two pairs of bar-like grooves 11 are in communication with each other to form the rectangular-ring-like thermal-insulation structure. In other words, each thermal-insulation structure includes a first bar-like groove, a second bar-like groove, a third bar-like groove and a fourth bar-like groove. The first and the second bar-like grooves extend along a same direction; and the third and the fourth bar-like grooves extend along a same direction. The first bar-like groove, the second bar-like groove, the third bar-like groove and the fourth bar-like groove are connected to each other end to end in sequence to form the rectangular-ring-like thermal-insulation structure.

Figure 5:
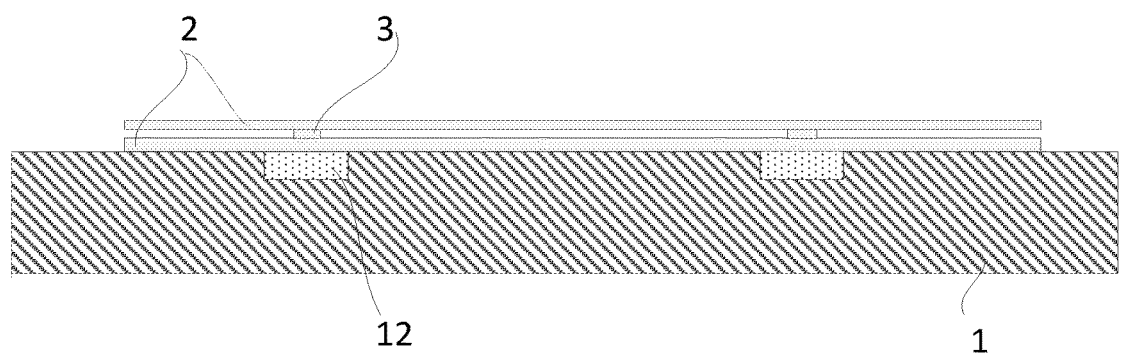
FIG. 5 is another sectional view of the pedestal of the laser packaging device together with a substrate to be packaged provided by some embodiments of the present disclosure.

In some embodiments of the present disclosure, as shown in FIG. 5, FIG. 5 is another sectional view of the pedestal of the laser packaging device together with a substrate to be packaged.

Each thermal-insulation structure includes a plurality of bar-like thermal-insulation layers 12 arranged on the metal pedestal body 1. The presence of the bar-like thermal-insulation layers 12 can prevent heat transferring from the glass powders 3 to the metal pedestal body 1.

Furthermore, the metal pedestal body 1 is provided with grooves for accommodating the plurality of bar-like thermal-insulation layers 12. In other words, upper surfaces of the thermal-insulation layers may be flush with a supporting surface (an upper surface) of the metal pedestal body for supporting the substrate, or lower surfaces of the thermal-insulation layers may be flush with the supporting surface (the upper surface) of the metal pedestal body for supporting the substrate. The presence of the grooves can improve flatness of one surface of the metal pedestal body for supporting the substrate, i.e., the supporting surface of the metal pedestal body.

The bar-like thermal-insulation layers hereinabove are made of aluminium silicate fiber, silica fiber or asbestos. Each glass-powder area forms a rectangular ring, and each thermal-insulation structure includes two pairs of bar-like thermal-insulation layers 12. The bar-like thermal-insulation layers 12 in each pair extend along the same direction, and the two pairs of the bar-like thermal-insulation layers 12 are connected to each other to form the rectangular-ring-like thermal-insulation structure. In other words, each thermal-insulation structure includes a first bar-like thermal-insulation layer, a second bar-like thermal-insulation layer, a third bar-like thermal-insulation layer and a fourth bar-like thermal-insulation layer. The first and the second bar-like thermal-insulation layers extend along a same direction, and the third and the fourth bar-like thermal-insulation layers extend along a same direction. The first bar-like thermal-insulation layer, the second bar-like thermal-insulation layer, the third bar-like thermal-insulation layer and the fourth bar-like thermal-insulation layer are connected to each other end to end in sequence to form the rectangular-ring-like thermal-insulation structure.

In some embodiments of the present disclosure, as shown in FIG. 2, a center line of a breadth of each bar-like groove of the rectangular-ring-like thermal-insulation structure is aligned to a center line of a breadth of each border of the rectangular-ring-like glass-powder area along a direction perpendicular to the metal pedestal body, and a difference W between a width of each bar-like groove of the rectangular-ring-like thermal-insulation structure and a width of each border of the corresponding rectangular-ring-like glass-powder area is smaller than 10 millimeters, so as to prevent the thermal-insulation structures from breaking down other parts of the device. For example, as shown in FIG. 2, W is smaller than 5 millimeters. A laser packaging device is provided by some embodiments of the present disclosure, including the pedestal hereinabove. By the pedestal hereinabove, the cooling rate of the glass powders 3 may be slowed, and then the probability of the occurrence of cracks after packaging the substrate 2 and the glass powders 3 may be reduced, thereby improving a yield of the packaging. Therefore, the laser packaging device provided by some embodiments of the present disclosure has a good usability.

Obviously, a person skilled in the art may make further modifications and improvements without departing from the principle of the present disclosure, and these modifications and improvements shall also fall within the scope of the present disclosure.

What is claimed is:

1. A pedestal of a laser packaging device, comprising a metal pedestal body and thermal-insulation structures;
   wherein the thermal-insulation structures are provided at a side of the metal pedestal body supporting a substrate to be packaged, and the thermal-insulation structures correspond to glass-powder areas of sub-substrates within the substrate to be packaged in a one-to-one manner.

2. The pedestal according to claim 1, wherein each of the thermal-insulation structures comprises a plurality of bar-like grooves arranged in the metal pedestal body; openings of the bar-like grooves are arranged toward to the substrate to be packaged.

3. The pedestal according to claim 2, further comprising an air vent defined in each of the bar-like grooves; wherein the air vent is in communication with a gasholder outside the pedestal and is to guide hot-gas in the gasholder to the substrate to be packaged.

4. The pedestal according to claim 2, wherein the thermal-insulation structures are in communication with each other; the pedestal further comprises an air vent in communication with a gasholder outside the pedestal; the air vent is in communication with the thermal-insulation structures and is to guide hot-gas in the gasholder to the substrate to be packaged.

5. The pedestal according to claim 4, wherein the air vent is surrounded by the thermal-insulation structures.

6. The pedestal according to claim 2, wherein each glass-powder area forms a rectangular ring; each of the thermal-insulation structures comprises two pairs of the bar-like grooves; the bar-like grooves in each pair extend along the same direction, and the two pairs of the bar-like grooves are in communication with each other to form the rectangular-ring-like thermal-insulation structure.

7. The pedestal according to claim 1, wherein each of the thermal-insulation structures comprises a plurality of bar-like thermal-insulation layers arranged at the metal pedestal body.

8. The pedestal according to claim 7, further comprising a plurality of grooves defined in the metal pedestal body; wherein the plurality of bar-like thermal-insulation layers is arranged in the grooves.

9. The pedestal according to claim 8, wherein the plurality of bar-like thermal-insulation layers is arranged in the grooves with upper surfaces of the plurality of bar-like thermal-insulation layers being flush with a supporting surface of the metal pedestal body for supporting the substrate to be packaged.

10. The pedestal according to claim 8, wherein the plurality of bar-like thermal-insulation layers is arranged in the grooves with upper surfaces of the plurality of bar-like thermal-insulation layers protruding from a supporting surface of the metal pedestal body for supporting the substrate to be packaged.

11. The pedestal according to claim 7, wherein each glass-powder area forms a rectangular ring; each of the thermal-insulation structures comprises two pairs of the bar-like thermal-insulation layers; the bar-like thermal-insulation layers in each pair extend along the same direction, and the two pairs of the bar-like thermal-insulation layers are connected to each other to form the rectangular-ring-like thermal-insulation structure.

12. The pedestal according to claim 7, wherein the bar-like thermal-insulation layers comprise aluminium silicate fiber, silica fiber or asbestos.

13. The pedestal according to claim 6, wherein a center line of each edge of the rectangular-ring-like thermal-insulation structure in a widthwise direction is aligned with a center line of a corresponding edge of the rectangular-ring-like glass-powder area in a widthwise direction, and a difference between a width of each edge of the rectangular-ring-like thermal-insulation structure and a width of a corresponding edge of the corresponding rectangular-ring-like glass-powder area is smaller than 10 millimeters.

14. The pedestal according to claim 1, wherein each of the thermal-insulation structures comprises a plurality of bar-like grooves defined in the metal pedestal body and filler in the plurality of bar-like grooves;

wherein the filler has a thermal conductivity smaller than a thermal conductivity of the metal pedestal body.

15. The pedestal according to claim 14, wherein the filler is air, aluminum silicate fiber, silica fiber or asbestos.

16. A laser packaging device, comprising the pedestal according to claim 1.

* * * * *